(12) United States Patent
Heiss (10) Patent No.: US 12,055,652 B2
(45) Date of Patent: Aug. 6, 2024

(54) RADAR DEVICES AND METHODS FOR RADAR DEVICES

(71) Applicant: Infineon Technologies AG, Neubiberg (DE)

(72) Inventor: Heinrich Guenther Heiss, Munich (DE)

(73) Assignee: Infineon Technologies AG, Neubiberg (DE)

( * ) Notice: Subject to any disclaimer, the term of this patent is extended or adjusted under 35 U.S.C. 154(b) by 276 days.

(21) Appl. No.: 17/371,392

(22) Filed: Jul. 9, 2021

(65) Prior Publication Data

US 2022/0026523 A1 Jan. 27, 2022

(30) Foreign Application Priority Data

Jul. 22, 2020 (EP) ..................................... 20187275

(51) Int. Cl.
| | | |
|---|---|---|
| *G01S 13/93* | (2020.01) | |
| *G01S 7/02* | (2006.01) | |
| *G01S 13/32* | (2006.01) | |
| *G01S 13/34* | (2006.01) | |
| *G01S 13/931* | (2020.01) | |

(52) U.S. Cl.
CPC .......... *G01S 7/0234* (2021.05); *G01S 13/325* (2013.01); *G01S 13/343* (2013.01); *G01S 13/931* (2013.01)

(58) Field of Classification Search
CPC .... G01S 13/325; G01S 13/343; G01S 13/931; G01S 13/345; G01S 7/006; G01S 7/023; G01S 7/0234; G01S 7/036
See application file for complete search history.

(56) References Cited

U.S. PATENT DOCUMENTS

| | | | | |
|---|---|---|---|---|
| 11,041,940 | B1* | 6/2021 | Hong | G01S 7/354 |
| 11,588,567 | B2* | 2/2023 | Nayyar | H04L 12/40 |
| 2007/0229349 | A1* | 10/2007 | Kajio | G01S 13/24 |
| | | | | 342/36 |
| 2015/0301172 | A1* | 10/2015 | Ossowska | G01S 13/878 |
| | | | | 342/70 |
| 2019/0293748 | A1* | 9/2019 | Gulati | G01S 13/343 |
| 2020/0284874 | A1* | 9/2020 | Narayana Moorthy | |
| | | | | G01S 13/343 |
| 2020/0341130 | A1* | 10/2020 | Hayashi | G01S 13/282 |
| 2020/0408891 | A1* | 12/2020 | Brett | G01S 13/931 |
| 2021/0190905 | A1* | 6/2021 | Roger | G01S 7/354 |
| 2021/0293948 | A1* | 9/2021 | Peng | G01S 7/415 |
| 2021/0389416 | A1* | 12/2021 | Hong | G01S 7/0233 |

FOREIGN PATENT DOCUMENTS

| | | |
|---|---|---|
| DE | 102009054776 A1 | 8/2010 |
| EP | 1775600 A1 | 4/2007 |
| EP | 3757597 A1 | 12/2020 |
| WO | 2019145072 A1 | 8/2019 |

* cited by examiner

*Primary Examiner* — Siu M Lee
(74) *Attorney, Agent, or Firm* — Slater Matsil, LLP (57) ABSTRACT

In accordance with an embodiment, a radar device includes transmit circuitry configured to emit a radar signal including a plurality of frames each comprising a respective sequence of chirps. The transmit circuitry is further configured to wirelessly emit information about the radar signal to a surrounding environment. The information indicates at least one of a positioning of sequential chirps with respect to each other for at least one of the plurality of frames and a positioning of sequential frames with respect to each other in the radar signal.

19 Claims, 8 Drawing Sheets

Emitting a radar signal including a sequence of chirps in a predefined radar frequency range

1000

RADAR DEVICES AND METHODS FOR RADAR DEVICES

CROSS-REFERENCE TO RELATED APPLICATIONS

This application claims the benefit of European Patent Application No. 20187275, filed on Jul. 22, 2020, which application is hereby incorporated herein by reference in its entirety.

TECHNICAL FIELD

The present disclosure relates to interference mitigation for radar devices. In particular, examples relate to radar devices and methods for radar devices.

BACKGROUND

Radar plays an important role in different applications such as, target tracking, positioning, monitoring of physical conditions, or motion/gesture sensing. Radar systems operating close by can interfere with each other. Also, radar systems may interfere with communication systems operating in the same frequency range as the radar systems.

Known concepts provide only insufficient interference mitigation.

SUMMARY

An example relates to a radar device comprising transmit circuitry. The transmit circuitry is configured to emit a radar signal including a plurality of frames each comprising a respective sequence of chirps and wirelessly emit information about the radar signal to the environment. The information indicates at least one of a positioning of sequential chirps with respect to each other for at least one of the plurality of frames and a positioning of sequential frames with respect to each other in the radar signal.

Another example relates to a method for a radar device. The method comprises emitting a radar signal including a plurality of frames each comprising a respective sequence of chirps and wirelessly emitting information about the radar signal to the environment. The information indicates at least one of a positioning of sequential chirps with respect to each other for at least one of the plurality of frames and a positioning of sequential frames with respect to each other in the radar signal.

A further example relates to a radar device comprising transmit circuitry and receive circuitry. The transmit circuitry is configured to emit a radar signal. The receive circuitry is configured to receive from another radar device information about another radar signal emitted by the other radar device. The other radar signal includes a plurality of frames each comprising a respective sequence of chirps. The information indicates at least one of a positioning of sequential chirps with respect to each other for at least one of the plurality of frames and a positioning of sequential frames with respect to each other in the other radar signal. The transmit circuitry is configured to dynamically adapt at least one parameter of the radar signal based on the information about the other radar signal.

Another example relates to another method for a radar device. The method comprises emitting a radar signal and receiving from another radar device information about another radar signal emitted by the other radar device. The other radar signal includes a plurality of frames each comprising a respective sequence of chirps. The information about the other radar signal indicates at least one of a positioning of sequential chirps with respect to each other for at least one of the plurality of frames and a positioning of sequential frames with respect to each other in the other radar signal. The method further includes dynamically adapting at least one parameter of the radar signal based on the information about the other radar signal.

A further example relates to a radar device comprising transmit circuitry configured to emit a radar signal including a sequence of chirps in a predefined radar frequency range. A plurality of frequency bands used in a wireless communication standard at least partly overlap with the predefined radar frequency range. The transmit circuitry is configured to emit sequential chirps of the sequence of chirps in different frequency bands of the plurality of frequency bands.

Another example relates to a method for a radar device. The method comprises emitting a radar signal including a sequence of chirps in a predefined radar frequency range. A plurality of frequency bands used in a wireless communication standard at least partly overlap with the predefined radar frequency range and the sequential chirps of the sequence of chirps are emitted in different frequency bands of the plurality of frequency bands.

BRIEF DESCRIPTION OF THE DRAWINGS

Some examples of apparatuses and/or methods will be described in the following by way of example only, and with reference to the accompanying figures, in which.

DETAILED DESCRIPTION OF ILLUSTRATIVE EMBODIMENTS

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 1:
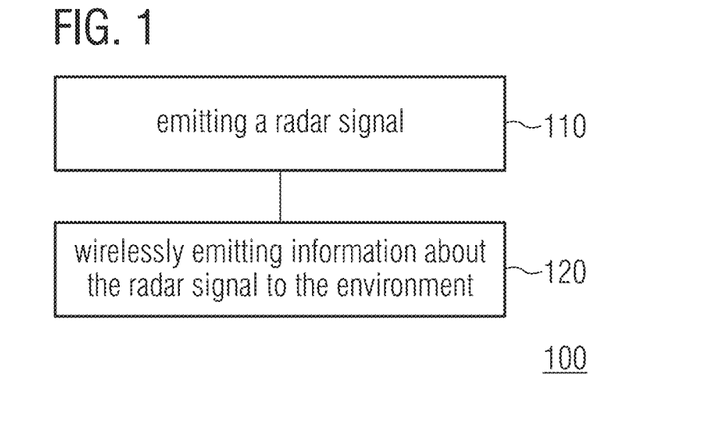
FIG. 1 illustrates a flow chart of an example of a method for a radar device.

FIG. 1 illustrates a method 100 for a radar device. Method 100 comprises emitting 110 a radar signal including a plurality of frames each comprising a respective sequence of chirps. Further, method 100 comprises wirelessly emitting 120 information about the radar signal to the environment. The information indicates at least one of a positioning of sequential (succeeding, e.g., directly succeeding) chirps with respect to each other for at least one of the plurality of frames and a positioning of sequential frames with respect to each other in the radar signal. The information may indicate only the positioning of sequential chirps with respect to each other for at least one of the plurality of frames, only the positioning of sequential frames with respect to each other in the radar signal, or both.

Method 100 allows a receiver of the information about the radar signal to take measures for mitigating interference with the radar device based on the information about the radar signal. For example, the receiver can be another radar device or a wireless communication system.

Figure 2:
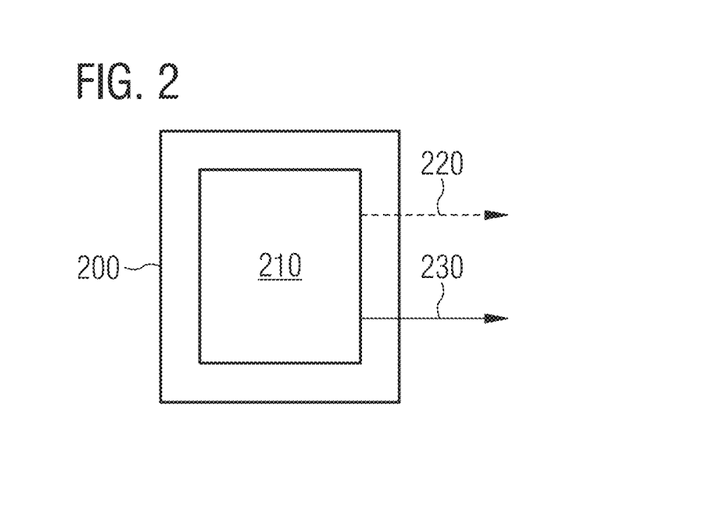
FIG. 2 illustrates an example of a radar device.

Method 100 can be carried out by a radar device 200 as shown in FIG. 2. The radar device 200 comprises transmit circuitry 210. The transmit circuitry 210 is configured to emit a radar signal 220 including a plurality of frames. Each of the plurality of chirps comprises a respective sequence of chirps. The transmit circuitry 210 is further configured to wirelessly emit information 230 about the radar signal 220 to the environment. The information 230 indicates the aforementioned positioning of sequential chirps with respect to each other for at least one of the plurality of frames and/or the positioning of sequential frames with respect to each other in the radar signal 220.

The transmit circuitry 210, for example, comprises at least one transmit antenna and signal generation circuitry for generating the radar signal and supplying it to the at least one transmit antenna for emission to the environment. The transmit circuitry 210 may comprise a plurality of transmit antennas to enable time division multiplexing multiple-input and multiple-output (TDM MIMO). Using TDM MIMO may enable improved an angular accuracy/resolution for target detection of one or more targets or modification of a beam width of the radar signal 220.

A chirp can be an "up-chirp" exhibiting an increasing frequency over time or a "down-chirp" exhibiting a decreasing frequency over time. A sequence of chirps in a frame may comprise exclusively up-chirps, exclusively down-chirps or a combination thereof. Also, the chirps can have the same or different shapes in the frequency domain. For example, a chirp's frequency over time may sweep (change) linearly or non-linearly.

A frame is a logic element of the radar signal 220 and exhibits a frame time. The frame time may be constant or vary among the plurality of frames. Each frame comprises a respective sequence of chirps. In other words, each frame comprises two or more chirps. The number of chirps in each frame may be constant or vary among the plurality of frames. The respective time interval between sequential chirps in a frame may vary or be constant. In other words, an off-time be sequential chirps may vary or be constant for a frame. The off-time between sequential chirps may be identical to or be different from a time interval between a last chirp of a frame and a start of a (directly) succeeding frame, as stated in more detail below.

The transmit circuitry 210 can use the at least one transmit antenna for transmitting the radar signal 220 and emitting the information 230 about the radar signal. Alternatively, the transmit circuitry 210 may comprise one or more separate antennas for emitting the information 230 about the radar signal.

The positioning of sequential chirps with respect to each other refers to the positioning of the sequential chirps with respect to each other in the time and/or frequency domain. Similarly, the positioning of sequential frames with respect to each other refers to the positioning of the sequential frames with respect to each other in the time and/or frequency domain. For example, the respective positioning may refer to a frequency and/or a time offset between sequential chirps or sequential frames.

Emitting the information 230 about the radar signal may enable another radar device receiving the information 230 to adjust one or more parameters of another radar signal emitted by the other radar device in order to reduce interference with the radar signal 220 emitted by the radar device 200. For example, the information 230 about the radar signal may enable the other radar device to adjust an emission time of a new frame including one or more chirps in the other radar signal such that they are emitted at different emission times compared to the frames/chirps emitted by the radar device 200. Accordingly, interference between the two radar devices may be at least reduced. Similarly, a (mobile) communication device receiving the information 230 about the radar signal may adjust one or more parameters of a transmit signal emitted by the communication device based on the information 230 about the radar signal. For example, the communication device may select a frequency band used for communication or transmit times for transmitting information based on the information 230 about the radar signal.

The transmit circuitry 210, for example, can emit the information 230 via the radar signal 220 and therefore encode the information about the radar signal 220 into the radar signal 220. This can make a costly separate antenna or additional costs relating to a higher chip complexity and/or a larger chip area for communicating the information 230 obsolete.

For example, the transmit circuitry 210 can emit the information 230 about the radar signal as a codeword selected among a plurality of predefined codewords. The codeword can, e.g., be emitted between sequential chirps or frames. A receiver of the codeword can decode the codeword and look up the information 230 represented by the codeword in a database (e.g. a "codebook") to obtain the information 230.

The radar device 200, for example, is implemented in a vehicle (e.g. to characterize the vehicle's environment) or other user equipment (e.g. a mobile device, home electronics, vacuum cleaner robots, and the like) for purposes of gesture, movement, or environment detection. The skilled person having benefit from the present disclosure will appreciate that the use of a codeword for communicating the information 230 may reduce an amount of data to be transmitted vis-à-vis other ways of communicating the information 230.

The radar device 200 may comprise further hardware—conventional and/or custom. For example, the radar device 200 may comprises receive circuitry for receiving and processing reflections of the radar signal from the environment.

Figure 3:
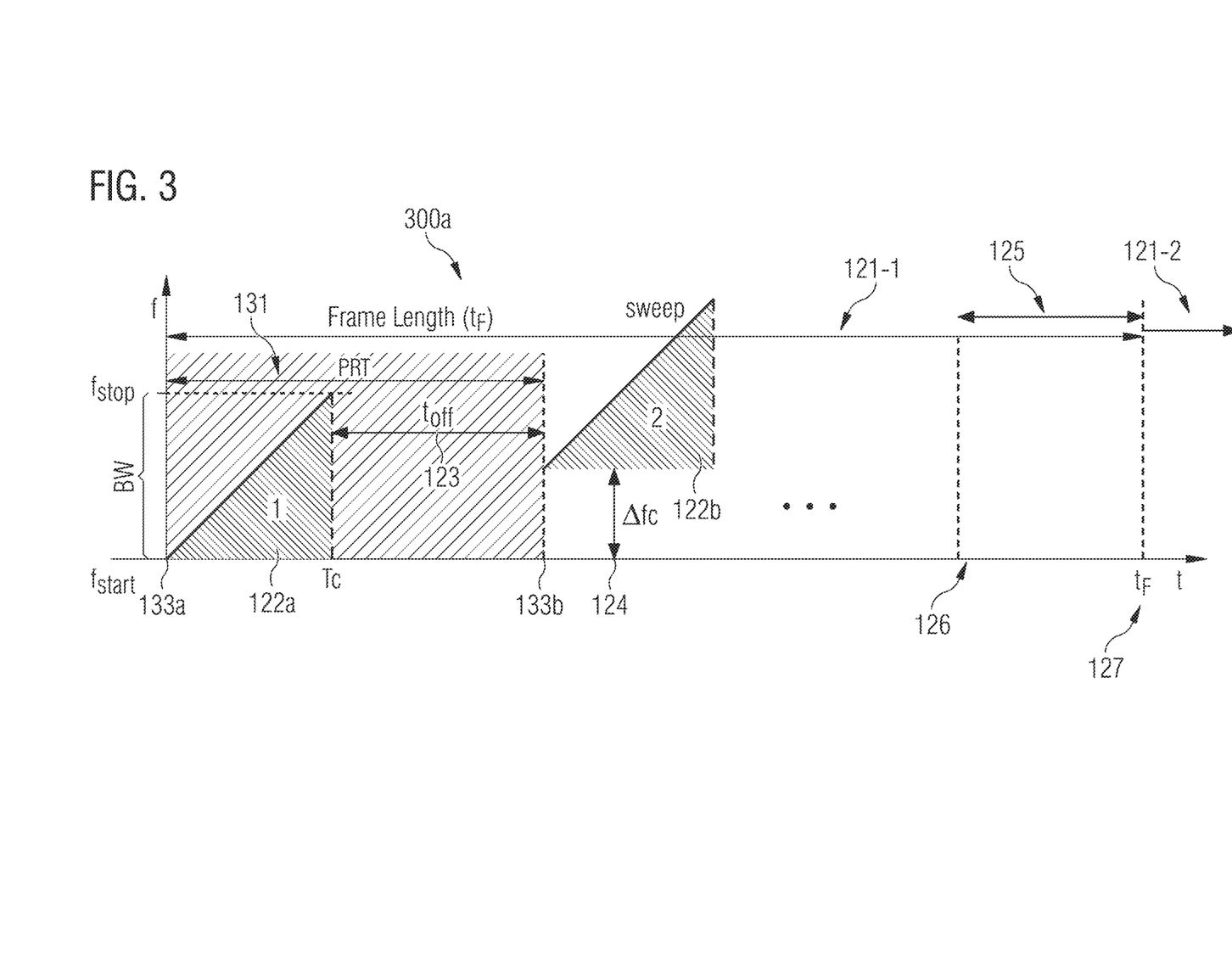
FIG. 3 schematically illustrates an exemplary positioning of chirps and frames in a radar signal.

FIG. 3 shows a diagram 300a schematically illustrating an exemplary positioning of sequential chirps 122a and 122b and sequential frames 121-1 and 121-2 in the radar signal 220. The abscissa of the diagram 300a denotes time, whereas the ordinate denotes frequency. For simplicity reasons, FIG. 3 illustrate the positioning of two sequential chirps/frames. However, it should be noted that the radar signal can comprise more frames and chirps and that the below explanations with reference to FIG. 3 also applies to the positioning of more than two chirps and frames, respectively.

In the time domain, the (relative) positioning of the chirps 122a and 122b with respect to each other is inter alia characterized by an off-time ("$t_{off}$") 123 between the sequential chirps 122a and 122b in frame 121-1. Therefore, the information 230 about the radar signal can indicate the off-time 123 between the sequential chirps 122a and 122b. For example, the off-time 123 can be equal for all pairs of sequential chirps in a frame or be different for one or more pairs of sequential chirps. In other examples, the off-time 123 can be equal for all chirps contained in the plurality of frames of the radar signal 220. A positioning of the chirps 122a and 122b can be further determined by a pulse repetition time (PRT) 131. The PRT 131 can be understood as a time interval of one repetitive variation of the radar signal 220 in the frequency domain. As can be seen from diagram 300a, the PRT 131, for example relates to a time interval between a start time 133a of chirp 122a and a start time 133b of the succeeding chirp 122b. In other words, the PRT 131 denotes the sum of the duration of the chirps 122a and the off-time 123 between the sequential chirps 122a and 122b. Hence, the information 230 can also indicate the positioning of the chirps 122a and 122b with respect to each other using the PRT 131. It should be noted that in other examples different definitions may be used for the PRT.

Alternatively or additionally, the information may indicate the positioning of the sequential frames 121-1 and 121-2 with respect to each other. To specify the positioning of the sequential frames 121-1 and 121-2, the information 230, e.g., indicates a time interval 125 between an end 126 of the last chirp in the sequence of chirps of the frame 121-1 and a start of the frame 121-2 which succeeds the frame 121-1. The end 126 of the last chirp, e.g., is defined as a point in time, at which the last chirp resumes to its start frequency. Alternatively, the end 126 may be defined as a point in time within the frame 121-1 at which the PRT for the last chirp ends (i.e. the time instant which trails the time instant at which the last chirp in the frame resumes to its start frequency by the off-time 123). The start of the frame 121-2, e.g., is defined as a point in time, at which a first chirp in the frame 121-2 starts to vary from its start frequency. Alternatively, the start of the frame 121-2 can be defined differently. The frames 121-1 and 121-2 may be considered adjacent to each other in the time domain. Thus, the start of the frame 121-2 may be equivalent to an end of the frame 121-1.

In the frequency domain, the (relative) positioning of the chirps 122a and 122b with respect to each other is inter alia characterized by a frequency offset ("Δfc") 124 between the chirps 122a and 122b. As can be seen in diagram 300a, the frequency offset 124 specifies a difference between a start frequency ("$f_{start}$") of the chirp 122a and a start frequency of the chirp 122b. The information 230 about the radar signal may indicate the frequency offset 124 between the chirps 122a and 122b.

Similarly, the positioning of the sequential frames 121-1 and 121-2 with respect to each other in the frequency domain is characterized inter alia by a frequency offset between the frames 121-1 and 121-2. The frequency offset specifies a difference between a start frequency of the frame 121-1 and a start frequency of the frame 121-2. In the example of FIG. 3, the frequency offset is zero, i.e. the start frequencies of the frames 121-1 and 121-2 are identical. The information 230 about the radar signal may indicate the frequency offset 124 between the frames 121-1 and 121-2.

The information 230 about the radar signal may indicate one or more of the above mentioned quantities for specifying the positioning of sequential chirps with respect to each other and/or the positioning of sequential frames with respect to each other. Additionally or alternatively, the information 230 about the radar signal may indicate one or more other quantities. For example, the information 230 about the radar signal may indicate a number of frames constituting the plurality of frames in the radar signal 220. In other examples, the information 230 about the radar signal may indicate for at least one chirp in the plurality of frames whether a frequency of the respective chirp sweeps (changes) linearly or non-linearly. Further, the information 230 about the radar signal may indicate a start frequency and/or a stop frequency and/or a chirp duration for at least one chirp in the plurality of frames. Similarly, the information 230 about the radar signal may indicate a start frequency and/or a stop frequency and/or a frame time (length/duration) for at least one of the plurality of frames.

Other radar devices receiving the above information 230 can adjust the positioning of frames and/or chirps of their radar signals in the time and/or frequency domain to reduce overlaps of their radar signals with the radar signal 220 and, thus, reduce interference with the radar device 200.

Figure 4A:
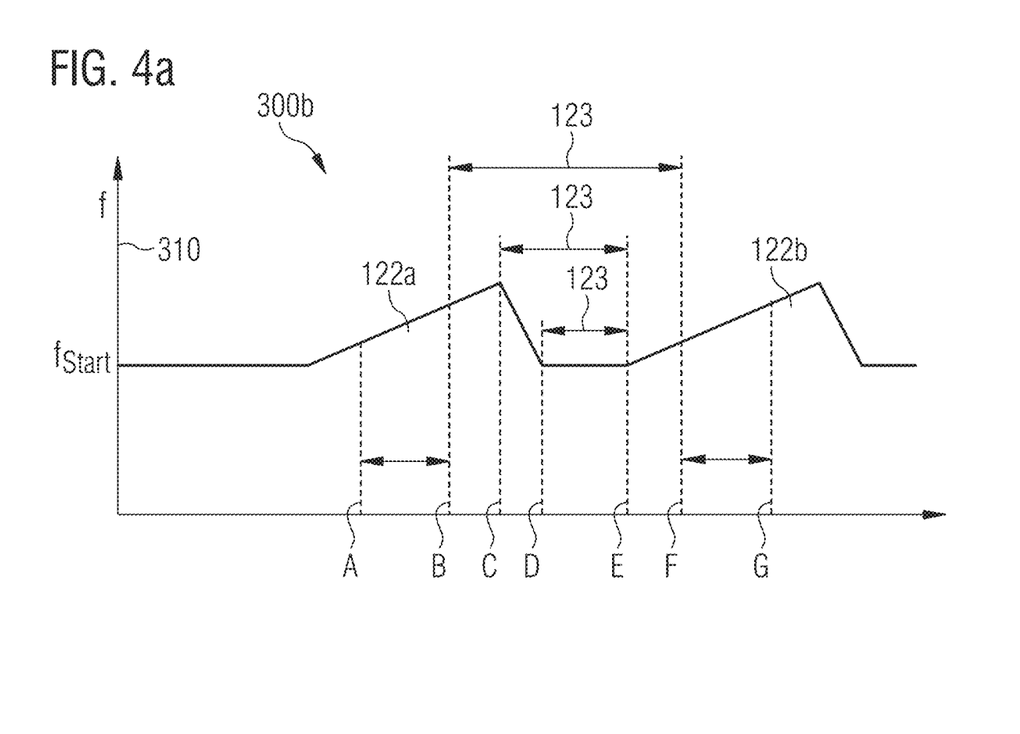
FIG. 4a schematically illustrates exemplary sequential chirps.

In some examples, different definitions for the off-time between sequential chirps may be used. FIG. 4a shows a diagram 300b for illustrating various exemplary definitions of the off-time between sequential chirps in the radar signal. The abscissa of the diagram 300b denotes time, whereas the ordinate denotes frequency. Again, the chirps 122a and 122b are exemplarily illustrated. For simplicity reasons, FIG. 4a illustrate the positioning of two sequential chirps. However, it should be noted that the radar signal can comprise more chirps and that the below explanations with reference to FIG. 4a also applies to more than two chirps.

According to one definition, the off-time 123 may be defined as the time interval between a time D, at which the leading chirp 122a of the chirps 122a and 122b resumes to its start frequency ("$f_{start}$") after a foregoing variation in the frequency domain, and a time E, at which the frequency of the trailing chirp 122b of the chirps 122a and 122b starts to vary (e.g. increase in case of an up-chirp or decrease in case of a down-chirp) from its start frequency ("$f_{start}$").

According to a further definition, the off-time 123 may be defined as the time interval between a time C, at which the frequency of the chirp 122a reaches its extreme value or greatest deviation from its start frequency (e.g. maximum value for an up-chirp or minimum value for a down-chirp), and the time E.

During the chirps 122a and 122b, an amplifier of the transmit circuitry 210 may amplify the radar signal 220 in time intervals from time A (start time of amplification) to B (end time of amplification) and time F (start time of amplification) to G (end time of amplification), respectively. According to another definition, the off-time 123 refers to the time interval between time B and time F.

Analogously, the off-time 123 may be defined by another combination of one of the times A, B, C and D with one of the times E, F and G.

For chirps with different frequency profiles ("shapes"), the off-time can be defined differently, as described with reference to FIG. 4b.

Figure 4B:
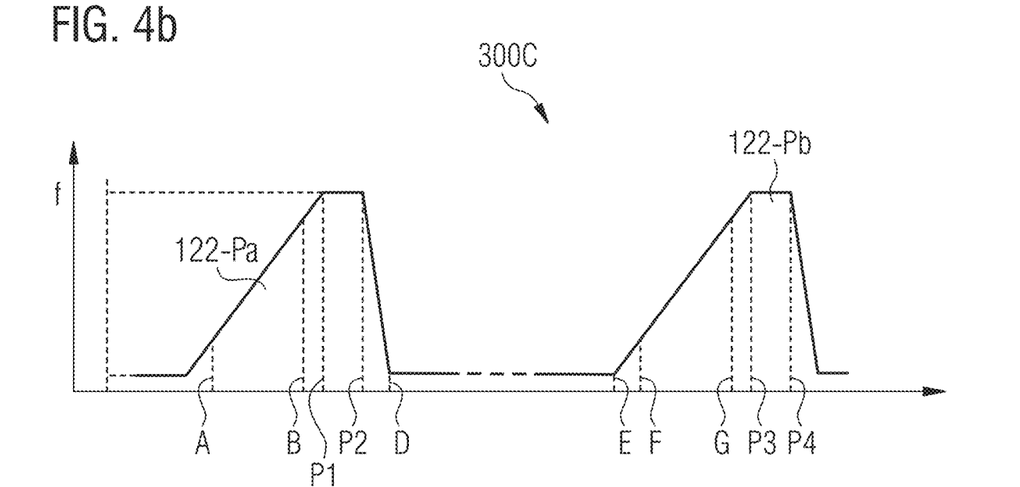
FIG. 4b schematically illustrates other example sequential chirps.

FIG. 4b illustrates two sequential chirps 122-Pa and 122-Pb in a diagram 300c. The abscissa of diagram 300c denotes time, whereas the ordinate of diagram 300c denotes frequency. The frequency profile of a chirp may exhibit a plateau where the frequency of the chirp is constant. In other words, the plateau is a portion of the chirp with a steady or invariable frequency (different from the start frequency). For example, the chirps 122-Pa and 122-Pb exhibit a plateau from time P1 to P2 and time P3 to P4, respectively. Again, the radar signal 220 is amplified from time A to time B during the chirps 122-Pa and from time F to time G during the chirp 122-Pb.

For example, the off-time between the chirps 122-Pa and 122-Pb may be defined as the time interval between the P2, at which the plateau of the chirp 122-Pa ends and the frequency of the chirp 122-Pa starts to change back to the start frequency, and the time E.

The skilled person will understand that the off-time between the chirps 122-Pa and 122-Pb may analogously be defined by any other combination of one of the times A, B, P1, P2 and D with one of the times P3, P4, E, F and G.

It is to be noted that the off-time may be defined differently for other frequency profiles of a chirp.

Figure 5:
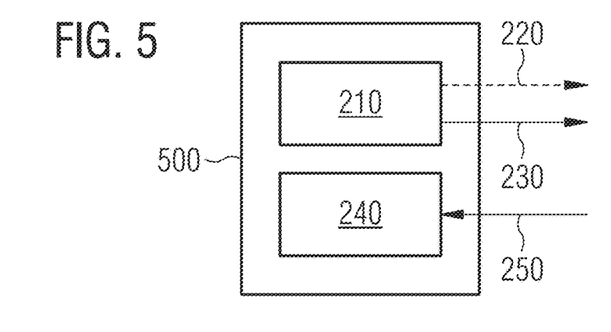
FIG. 5 illustrates another example of a radar device.

Another radar device 500 is illustrated in FIG. 5. In comparison to the radar device 200, the radar device 500 additionally comprises receive circuitry 240 configured to receive from another radar device (not shown) information 250 about another radar signal emitted by the other radar device. The information 250 about the other radar signal indicates at least one of a positioning of sequential chirps with respect to each other for at least one of a plurality of frames in the other radar signal and a positioning of sequential frames with respect to each other in the other radar signal. The transmit circuitry 210 of the radar device 500 is configured to dynamically adapt at least one parameter of the radar signal 220 based on the information 250 about the other radar signal. In this way, the radar device 200 can reduce or mitigate interference with the other radar device.

The receive circuitry 240, for example, comprises one or more receive antennas/channels for wirelessly receiving one or more signals bearing the information 250 and processing circuitry for obtaining the information 250 from the one or more signals.

The information 250 about the other radar signal comprises equivalent information as the information 230 about the radar signal. For example, information 250 about the other radar signal may indicate a frequency offset between sequential chirps of a common or sequential frames, a frequency offset between frames, and/or a number of frames constituting a plurality of frames in the other radar signal.

In some applications, the information 230 and/or 250 about the radar signal 220 and the other radar signal, respectively, further indicates for at least one frame and at least chirp of the sequence of chirps therein whether a frequency of the respective chirp sweeps linearly or nonlinearly.

In other words, the information 230 and 250 may indicate whether a frequency ramp of the respective chirps or multiple chirps is linear or nonlinear. Instead of linear frequency ramps, the chirps can, for example, have nonlinear exponential frequency ramps.

Such information on the frequency ramp of the chirp or multiple chirps allows the radar device 200 or the other radar device to adapt, for example, the frequency ramps of their respective emitted chirps such that their overlap with each other in the frequency domain is reduced.

Such ramps and chirps of radar signals may also have different shapes. For example, chirps may also have a plateau at their maximum frequency or different slopes. Further, the radar signal 220 and/or the other waveform signal can be characterized by other waveform parameters.

It is noted that the radar device 200 further can emit or receive information on a shape, slope, and/or other waveform parameters to allow a further mitigation of radar interference based on those information.

Based on the information 250 about the other radar signal, the radar device 200 is enabled to adapt, e.g., a frequency offset between sequential chirps or sequential frames in the radar signal 220 and/or a number of frames constituting a plurality of frames in the radar signal 220 in order to reduce interference between both radar signals.

For example, the information 250 about the other radar signal may indicate an off-time between sequential chirps of the other radar signal. Accordingly, the transmit circuitry may adapt the emission time of at least one chirp in the radar signal 220 such that the chirp is emitted during the off-time between sequential chirps in the other radar signal. Thus, interference between both radar signals can be at least reduced.

The transmit circuitry 210 of the radar device 500 can be configured to emit the radar signal in a predefined radar frequency range and the receive circuitry can be configured to receive the information 250 about the other radar signal via a communication channel outside the predefined radar frequency range. Alternatively, the transmit circuitry 210 can emit the 250 about the other radar signal via the communication channel outside the predefined frequency range. The radar frequency range may be any frequency range suitable for radar. For example, the radar frequency range may be around 60 GHz or 120 GHz. Optionally, the radar frequency range may at least partially overlap with an industrial, scientific, and medical (ISM) band. Alternatively, the frequency range may not overlap with the ISM band. Alternatively, the radar frequency range may be at lower (e.g. MHz range) or higher (e.g. 100 s of GHz) frequencies. Also, the bandwidth of the radar frequency range may be any suitable range. For example, the bandwidth may be 1 GHz or 4 GHz. Alternatively, the bandwidth may be smaller (e.g. a few MHz) or larger (e.g. 10 s of GHz).

Using a communication channel outside the used radar frequency range may ensure that the emission of the information 250 is not subject to interference with radar signals of radar devices operating in the radar frequency range.

Using a communication channel within the used radar frequency range may allow to, e.g., encode the information 220 and/or 250 to the respective radar signal.

Similarly, the transmit circuitry 210 can emit the information 230 via a communication channel within the predefined radar frequency range or via a communication channel outside the predefined radar frequency range. Accordingly, the information 230 may either be emitted without occupying further bandwidth outside the predefined radar frequency range or not be subject to interference with radar signals of radar devices operating in the radar frequency range. In some examples, the information 230/250 may be transmitted via an existing ISM (industrial, scientific, and medical) band released for radar and communication.

In some scenarios, a radar device operates in proximity of a (mobile) communication device such that a radar signal emitted by the radar device may interfere with a transmit signal emitted by the communication device. This is exemplarily illustrated in FIG. 6a.

Figure 6A:
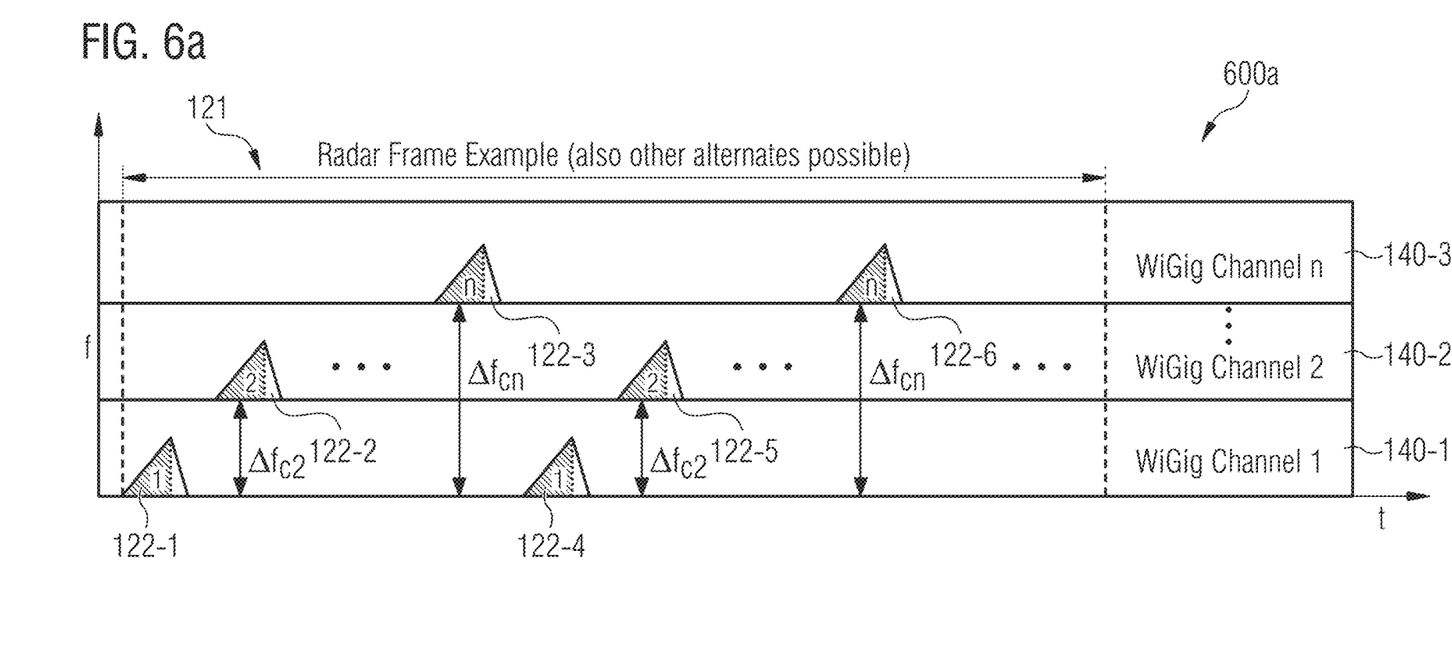
FIG. 6a illustrates a first exemplary positioning of chirps in a frequency range of a radar signal.

FIG. 6a illustrates a diagram 600a including a frame 121 of a radar signal emitted by a radar device according to the proposed architecture. The abscissa of the diagram 600a denotes time, whereas the ordinate denotes frequency. The sequence of chirps 122-1, 122-2, 122-3, 122-4, 122-5, and 122-6 of the frame 121 is emitted in predefined radar frequency range. Further, three frequency bands 140-1, 140-2 and 140-3 used for the WiGig standard (e.g. as defined in the standards IEEE 802.11ad or IEEE 802.11ay of the Institute of Electrical and Electronics Engineers, IEEE) are illustrated. The frequency bands 140-1, 140-2 and 140-3 overlap with the predefined radar frequency range used for the emission of the radar signal. In order to reduce interference between the radar signal and a WiGig transmit signal, the transmit circuitry 210 of a radar device according to the proposed architecture is configured to emit sequential chirps of the sequence of chirps in different ones of the frequency bands 140-1, 140-2 and 140-3. For example, the chirp 122 is emitted in the first frequency band 140-1, whereas the directly succeeding chirp 122-2 is emitted in the neighboring second frequency band 140-2. Subsequent chirps can be equivalently emitted in the next successive frequency band such that the chirp 122-3, e.g., is emitted in the frequency band 140-3.

Subsequently, the chirps 144-4, 122-5, and 122-6 can be distributed over the frequency bands 140-1, 140-2, and 140-3 in the same manner as the preceding chirps 122-1, 122-2, and 122-3. To this end, the chirp 122-4 succeeding the chirp 122-3, e.g., is emitted again in the frequency band 140-1 and the succeeding chirp 122-5 is emitted in the neighboring frequency band 140-2 again. This allows an even distribution of the chirps 122-1, . . . , and 122-6 over the frequency bands 140-1, 140-2, and 140-3.

To emit the sequential chirps 122-1, . . . , and 122-6 in the different frequency bands 140-1, 140-2, and 140-3, the transmit circuitry 210 can, e.g., set the frequency offset between sequential chirps to at least a bandwidth of the frequency bands 140-1, 140-2, and 140-3, and a bandwidth of the chirps 122-1, . . . , and 122-6 to a value below the bandwidth of the frequency bands 140-1, 140-2, and 140-3.

Although sequential chirps (e.g. the chirps 122-1 and 122-2) are emitted in neighboring frequency bands, it should be noted that the proposed technique is not limited thereto. Subsequent chirps may be emitted in any two different frequency bands (e.g. randomly). For example, if the chirp 122-1 is emitted in the frequency band 140-1, the chirp 122-3 may be emitted in the frequency band 140-3 instead of the frequency band 140-2 and the chirp 122-3 may be emitted in the frequency band 140-2 instead of the frequency band 140-3.

It is to be noted that WiGig is merely an example for a communication standard. Analogously, the proposed technique may be used for any communication standard using a plurality of frequency bands that at least partly overlap with the radar frequency range used by the radar device for emitting the radar signal. For example, the proposed technique may be used for the communication standard Wireless HD as well. Further, it is to be noted that the number of frequency bands in the example of FIG. 6a is merely exemplary and that any other number of frequency bands may be used as well.

The skilled person having benefit from the present disclosure will appreciate that the larger a time interval between sequential chirps in the same frequency band is, the lower may be an interference of the chirp with communication signals in the respective frequency band.

Due to the distribution of the chirps 122-1, . . . , and 122-6 over the frequency bands 140-1,0 140-2 and 140-3, a time interval between sequential chirps in the same frequency band increases and, thus, mitigates interference/disturbances and latency in the frequency bands 140-1,0 140-2 and 140-3.

The skilled person will understand that a distribution of the chirps 122-1, . . . , and 122-6 over several frequency bands allows reducing the off-time between sequential chirps vis-à-vis a sequence of chirps exclusively emitted in a single frequency band, without increasing interference. The skilled person will also understand that a reduced off-time may lead to an enhanced speed resolution in movement detection or tracking applications of the radar device 200.

Figure 6B:
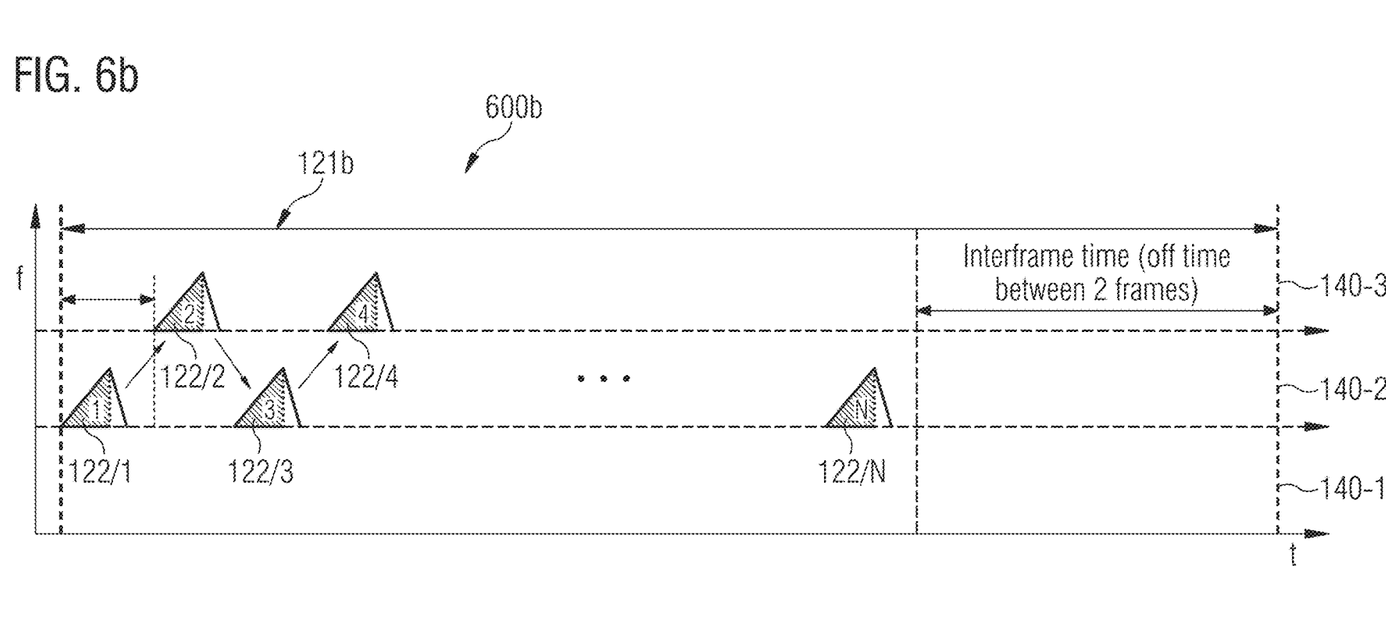
FIG. 6b illustrates a second exemplary positioning of chirps in a frequency range of a radar signal.
Figure 6C:
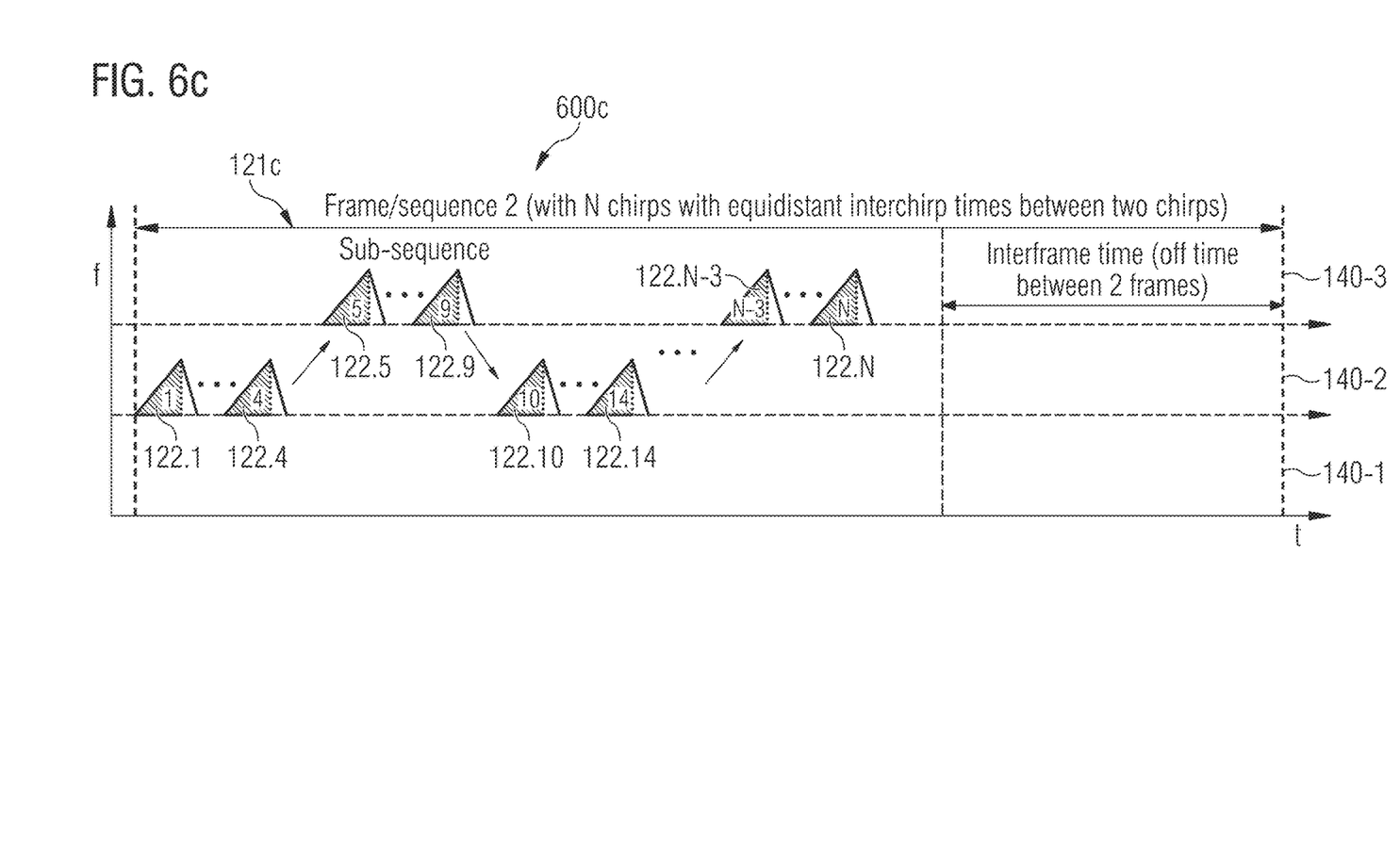
FIG. 6c illustrates a third exemplary positioning of chirps in a frequency range of a radar signal.

FIG. 6b and FIG. 6c illustrate alternative exemplary positionings of chirps in radar signal for mitigating interference with overlapping frequency bands used for a communication standard.

In the exemplary diagram 600b of FIG. 6b, the transmit circuitry 210 emits the sequential chirps 122/1, 122/2, 122/3, 122/3, 122/4, and 122/4 of the sequence of chirps in the frame 121b alternatingly in the different frequency bands 140-2 and 140-3 among the three frequency bands 140-1, 140-2 and 140-3. For example, the chirp 122/1 is emitted in the frequency band 140-2, whereas the next chirp 122/2 is emitted in the adjacent frequency band 140-3, and the chirp 122/3 after next again is emitted in the frequency band 140-2. Accordingly, the interference between the radar signal and communication signals in the frequency bands 140-2 and 140-3 may be reduced.

In the exemplary diagram 600c of FIG. 6c, the transmit circuitry 210 emits subsequences of the sequence of chirps in the frame 121c alternatingly in the different frequency bands 140-2 and 140-3 among the three frequency bands 140-1, 140-2 and 140-3. As can be seen from FIG. 6c, the first subsequence comprises the chirps 122.1 to 122.4 emitted in the frequency band 140-2, the second subsequence comprises the chirps 122.5 to 122.9 emitted in the frequency band 140-3, the third subsequence comprises the chirps 122.10 to 122.14 again emitted in the frequency band 140-2, and the fourth subsequence comprises the chirps 122.N-3 to 122.N again emitted in the frequency band 140-3. Accordingly, the interference between the radar signal and communication signals in the frequency bands 140-2 and 140-3 may be reduced.

The transmit circuitry 210 may use two or more antennas for a MIMO-based emission of the individual chirps in a frame of the radar signal. For example, one of the two or more antennas is used to emit the chirps in the frequency band 140-2 and the other antenna of the two or more antennas is used for emitting the chirps in the frequency band 140-3. In the example of FIG. 6b, one of the antennas, e.g., emits the chirps 122/1, 122/3, 122/N and the other antenna emits the chirps 122/2 and 122/4. In the example of FIG. 6c, one of the antennas, e.g., emits the chirps 122.1 to 122.4, 122.10 to 122.14 and the other antenna emits the chirps 122.5 to 122.9 and 122.N-3 to 122.N. In other examples, different antennas may be used to emit sequential chirps.

Figure 7:
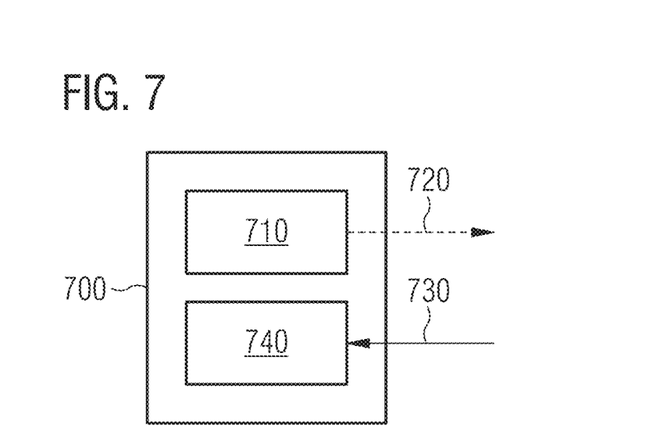
FIG. 7 illustrates another example of a radar device.

The above description mainly focused on the emission of information about a radar signal emitted by a radar device. In order to more particularly focus on the radar device's processing of received information about another radar signal emitted by another radar device, FIG. 7 illustrates another radar device 700.

The radar device 700 comprises transmit circuitry 710 and receive circuitry 740. The transmit circuitry 710 is configured to emit a radar signal 720 (e.g. similar to one of the radar signals described above). The receive circuitry 740 is configured to receive from another radar device (not illustrated) information 730 about another radar signal emitted by the other radar device. The other radar signal includes a plurality of frames each comprising a respective sequence of chirps. The information 730 indicates at least one of a positioning of sequential chirps with respect to each other for at least one of the plurality of frames and a positioning of sequential frames with respect to each other in the other radar signal. The transmit circuitry 710 is further configured to dynamically adapt at least one parameter of its own radar signal 720 based on the information 730 about the other radar signal to reduce interference with the other radar signal.

Figure 8:
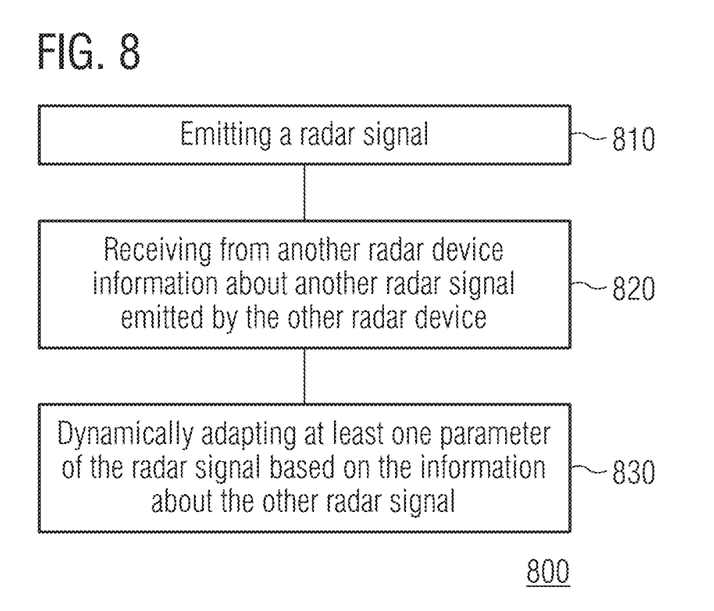
FIG. 8 illustrates a flow chart of another example of a method for a radar device.

A flow chart of an equivalent method 800 for the radar device 700 is illustrated in FIG. 8.

Method 800 comprises emitting 810 a radar signal and receiving 820 from another radar device information about another radar signal emitted by the other radar device. The other radar signal includes a plurality of frames each comprising a respective sequence of chirps. The information about the other radar signal indicates at least one of a positioning of sequential chirps with respect to each other for at least one of the plurality of frames and a positioning of sequential frames with respect to each other in the other radar signal. Method 800 further comprises dynamically adapting 830 at least one parameter of the radar signal based on the information about the other radar signal.

As described above in detail, the transmit circuitry 710 may, e.g., adapt the frequency offset between sequential chirps or sequential frames, the off-time between sequential chirps of the same frame, the positioning of sequential frames with respect to each other in the time domain, a number of frames in the radar signal, or other parameters to reduce interference between the two radar signals. For the details, it is referred to the above description of the radar devices 200 and 500.

Figure 9:
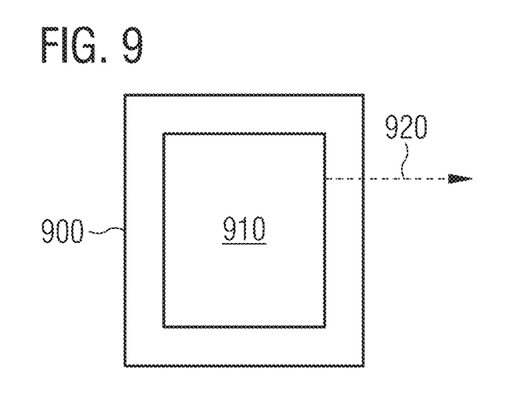
FIG. 9 illustrates a further example of a radar device.

Another radar device 900 adapted to mitigate interference according to the proposed concept is further illustrated in FIG. 9. The radar device 900 comprises transmit circuitry 910 configured to emit a radar signal 920 including a sequence of chirps in a predefined radar frequency range. A plurality of frequency bands used in a wireless communication standard at least partly overlap with the predefined radar frequency range. The transmit circuitry 910 is configured to emit sequential chirps of the sequence of chirps in different frequency bands of the plurality of frequency bands.

By emitting sequential chirps in different frequency bands, the radar device 900 may reduce interference with communication signals in the individual frequency bands. The radar device 900 may, e.g., shift the frequencies of the individual chirps of the radar signal as described above with reference to FIGS. 6a, 6b, and 6c.

For example, the chirps of the sequence of chirps may be grouped in frames similar to what is described above. Accordingly, the transmit circuitry can be further configured to wirelessly emit information about the radar signal 920 to the environment. The information may indicate at least one of a positioning of sequential chirps with respect to each other for at least one of the plurality of frames and a positioning of sequential frames with respect to each other in the radar signal 920.

As described above, the information about the radar signal 920 can, e.g., indicate an off-time between sequential chirps and a frequency offset between sequential chirps in the radar signal.

Optionally, the radar device 900 can comprise a receive circuitry configured to receive from another radar device information about another radar signal emitted by the other radar device. Also, the transmit circuitry 910 can be configured to dynamically adapt at least one parameter of the radar signal based on the information about the other radar signal.

The skilled person having benefit from the present disclosure will appreciate that the functionalities and features described in connection with the aforementioned radar devices 200, 500 and 700 can be also applied to the radar device 900.

Figure 10:
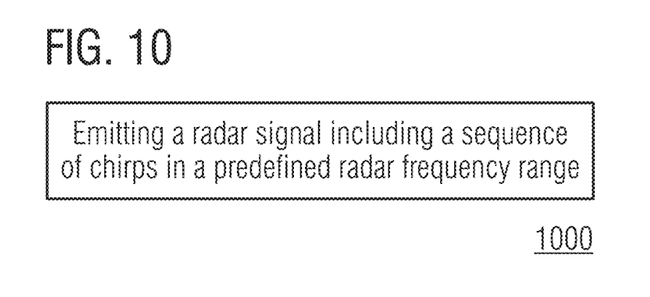
FIG. 10 illustrates a flow chart of a further example of a method for a radar device.

A flow chart of an equivalent method 1000 for the radar device 900 is illustrated in FIG. 10. Method 1000 comprises emitting a radar signal including a sequence of chirps in a predefined radar frequency range. A plurality of frequency bands used in a wireless communication standard at least partly overlap with the predefined radar frequency range and the sequential chirps of the sequence of chirps are emitted in different frequency bands of the plurality of frequency bands.

The examples described herein may be summarized as follows:

Some examples relate to a radar device comprising transmit circuitry configured to emit a radar signal including a plurality of frames each comprising a respective sequence of chirps and wirelessly emit information about the radar signal to the environment. The information indicates at least one of a positioning of sequential chirps with respect to each other for at least one of the plurality of frames and a positioning of sequential frames with respect to each other in the radar signal.

In some examples the radar device further comprises receive circuitry configured to receive from another radar device information about another radar signal emitted by the other radar device. The information about the other radar signal may indicate at least one of a positioning of sequential chirps with respect to each other for at least one of a plurality of frames in the other radar signal and a positioning of sequential frames with respect to each other in the other radar signal. The transmit circuitry can be configured to dynamically adapt at least one parameter of the radar signal based on the information about the other radar signal.

According to some examples, the information about the other radar signal indicates an off-time between sequential chirps of the other radar signal. The parameter may indicate an emission time of a chirp in one of the plurality of frames. The transmit circuitry can be configured to adapt the emission time such that the chirp is emitted during the off-time between sequential chirps in the other radar signal.

In some examples, the transmit circuitry is configured to emit the radar signal in a predefined radar frequency range and the receive circuitry can be configured to receive the information about the other radar signal via a communication channel outside the predefined radar frequency range.

According to some examples, the transmit circuitry is configured to emit the radar signal in a predefined radar frequency range and the receive circuitry is configured to receive the information about the other radar signal via a communication channel within the predefined radar frequency range.

In some examples, the information about the radar signal further indicates for at least one chirp in the plurality of frames whether a frequency of the respective chirp sweeps linearly or nonlinearly.

According to some examples, the information about the radar signal indicates at least one of a time interval between an end of a last chirp in a first frame of the plurality of frames and a start of a second frame of the plurality of frames which succeeds the first frame, a frequency offset between sequential frames of the plurality of frames, a number of frames constituting the plurality of frames and for at least one of the plurality of frames a frequency offset between sequential chirps within the respective frame.

In some examples, the transmit circuitry is configured to emit the radar signal in a predefined radar frequency range and a plurality of frequency bands used in a wireless communication standard at least partly overlap with the predefined radar frequency range. The transmit circuitry can be configured to emit for at least one of the plurality of frames sequential chirps of the respective sequence of chirps in different frequency bands of the plurality of frequency bands.

According to some examples, the transmit circuitry is configured to emit the radar signal in a predefined radar frequency range and to wirelessly emit the information about the radar signal via a communication channel within the predefined radar frequency range.

In some examples, the transmit circuitry is configured to encode the information about the radar signal into the radar signal.

According to some examples, the transmit circuitry is configured to emit the radar signal in a predefined radar frequency range, and wherein the transmit circuitry is configured to wirelessly emit the information about the radar signal via a communication channel outside the predefined radar frequency range.

In some examples, the information about the radar signal is emitted as a codeword selected among a plurality of predefined codewords.

Some examples relate to a method for a radar device. The method comprises emitting a radar signal including a plurality of frames each comprising a respective sequence of chirps and wirelessly emitting information about the radar signal to the environment. The information indicates at least one of a positioning of sequential chirps with respect to each other for at least one of the plurality of frames and a positioning of sequential frames with respect to each other in the radar signal.

Some examples relate to a radar device comprising transmit circuitry and receive circuitry. The transmit circuitry is configured to emit a radar signal. The receive circuitry is configured to receive from another radar device information about another radar signal emitted by the other radar device. The other radar signal includes a plurality of frames each comprising a respective sequence of chirps. The information about the other radar signal indicates at least one of a positioning of sequential chirps with respect to each other for at least one of the plurality of frames and a positioning of sequential frames with respect to each other in the other radar signal. The transmit circuitry is configured to dynamically adapt at least one parameter of the radar signal based on the information about the other radar signal.

Some examples relate to a method for a radar device. The method comprises emitting a radar signal and receiving from another radar device information about another radar signal emitted by the other radar device. The other radar signal includes a plurality of frames each comprising a respective sequence of chirps. The information about the other radar signal indicates at least one of a positioning of sequential chirps with respect to each other for at least one of the plurality of frames and a positioning of sequential frames with respect to each other in the other radar signal. The method further comprises dynamically adapting at least one parameter of the radar signal based on the information about the other radar signal.

Some examples relate to a radar device comprising transmit circuitry configured to emit a radar signal including a sequence of chirps in a predefined radar frequency range and a plurality of frequency bands used in a wireless communication standard at least partly overlap with the predefined radar frequency range. The transmit circuitry is configured to emit sequential chirps of the sequence of chirps in different frequency bands of the plurality of frequency bands.

In some examples, the chirps of the sequence of chirps are grouped in frames and the transmit circuitry is further configured to wirelessly emit information about the radar signal to the environment. The information indicates at least one of a positioning of sequential chirps with respect to each other for at least one of the plurality of frames and a positioning of sequential frames with respect to each other in the radar signal.

According to some examples, the information about the radar signal indicates an off-time between sequential chirps and/or a frequency offset between sequential chirps.

In some examples, the radar device further comprises receive circuitry configured to receive from another radar device information about another radar signal emitted by the other radar device and the transmit circuitry is configured to dynamically adapt at least one parameter of the radar signal based on the information about the other radar signal.

Some examples relate to a method for a radar device. The method comprises emitting a radar signal including a sequence of chirps in a predefined radar frequency range. A plurality of frequency bands used in a wireless communication standard may at least partly overlap with the predefined radar frequency range and sequential chirps of the sequence of chirps are emitted in different frequency bands of the plurality of frequency bands.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component.

Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A radar device comprising:
   transmit circuitry configured to:
      emit a radar signal including a plurality of frames that each comprise a respective sequence of chirps,
      vary an off-time between sequential chirps of the respective sequence of chirps of a same frame of the plurality of frames, and
      wirelessly emit information about the radar signal to a surrounding environment, the information indicating a positioning of sequential chirps with respect to each other for at least one of the plurality of frames; and receive circuitry configured to receive information from a further radar device about a further radar signal emitted by the further radar device, wherein the information about the further radar signal indicates an off-time between sequential chirps of a frame of the further radar signal, wherein the transmit circuitry is configured to dynamically adapt at least one parameter of the radar signal based on the information about the further radar signal, wherein the parameter indicates an emission time of a chirp in one of the plurality of frames, and wherein the transmit circuitry is further configured to adapt the emission time of the chirp such that the chirp is emitted during the off-time between the sequential chirps of the frame of the further radar signal.

2. The radar device of claim 1, wherein the information about the further radar signal indicates at least one of a positioning of sequential chirps with respect to each other for at least one of a plurality of frames in the further radar signal or a positioning of sequential frames with respect to each other in the further radar signal.

3. The radar device of claim 2, wherein the transmit circuitry is configured to emit the radar signal in a predefined radar frequency range, and wherein the receive circuitry is configured to receive the information about the further radar signal via a communication channel outside the predefined radar frequency range.

4. The radar device of claim 2, wherein the transmit circuitry is configured to emit the radar signal in a predefined radar frequency range, and wherein the receive circuitry is configured to receive the information about the further radar signal via a communication channel within the predefined radar frequency range.

5. The radar device of claim 1, wherein the information about the radar signal further indicates for at least one chirp in the plurality of frames whether a frequency of the respective chirp sweeps linearly or nonlinearly.

6. The radar device of claim 1, wherein the information about the radar signal indicates at least one of a time interval between an end of a last chirp in a first frame of the plurality of frames or a start of a second frame of the plurality of frames which succeeds the first frame, a frequency offset between sequential frames of the plurality of frames, a number of frames constituting the plurality of frames or for at least one of the plurality of frames a frequency offset between sequential chirps within the respective frame.

7. The radar device of claim 1, wherein the transmit circuitry is configured to emit the radar signal in a predefined radar frequency range, wherein a plurality of frequency bands used in a wireless communication standard at least partly overlap with the predefined radar frequency range, and wherein the transmit circuitry is configured to emit for at least one of the plurality of frames sequential chirps of the respective sequence of chirps in different frequency bands of the plurality of frequency bands.

8. The radar device of claim 1, wherein the transmit circuitry is configured to emit the radar signal in a predefined radar frequency range, and wherein the transmit circuitry is configured to wirelessly emit the information about the radar signal via a communication channel within the predefined radar frequency range.

9. The radar device of claim 8, wherein the transmit circuitry is configured to encode the information about the radar signal into the radar signal.

10. The radar device of claim 1, wherein the transmit circuitry is configured to emit the radar signal in a predefined radar frequency range, and wherein the transmit circuitry is configured to wirelessly emit the information about the radar signal via a communication channel outside the predefined radar frequency range.

11. The radar device of claim 1, wherein the information about the radar signal is emitted as a codeword selected among a plurality of predefined codewords.

12. A method for a radar device, the method comprising:
emitting a radar signal including a plurality of frames that each comprise a respective sequence of chirps;
varying an off-time between sequential chirps of the respective sequence of chirps of a same frame of the plurality of frames;
wirelessly emitting information about the radar signal to a surrounding environment, the information indicating a positioning of sequential chirps with respect to each other for at least one of the plurality of frames;
wirelessly receiving information from a further radar device about a further radar signal emitted by the further radar device, wherein the information about the further radar signal indicates an off-time between sequential chirps of a frame of the further radar signal;
dynamically adapting at least one parameter of the radar signal based on the information about the further radar signal, wherein the parameter indicates an emission time of a chirp in one of the plurality of frames; and
adapting the emission time such that the chirp is emitted during the off-time between the sequential chirps of the frame of the further radar signal.

13. The method of claim 12, wherein the information indicating the positioning of the sequential chirps with respect to each other comprises information describing frequencies and timing of the sequential chirps.

14. The method of claim 12, wherein wirelessly emitting the information about the radar signal comprises wirelessly emitting information within a same frequency range as the radar signal.

15. The method of claim 12, wherein wirelessly emitting the information about the radar signal comprises wirelessly emitting information outside of a frequency range as the radar signal.

16. A radar device comprising:
transmit circuitry configured to emit a radar signal including a plurality of frames that each comprise a respective sequence of chirps, and vary an off-time between sequential chirps of the respective sequence of chirps of a same frame of the plurality of frames; and
receive circuitry configured to receive from a further radar device information about a further radar signal emitted by the further radar device, wherein the further radar signal includes a plurality of frames that each comprise a respective sequence of chirps, and wherein the information about the further radar signal indicates a positioning of sequential chirps with respect to each other for at least one of the plurality of frames of the further radar signal,
wherein the transmit circuitry is configured to dynamically adapt at least one parameter of the radar signal based on the information about the further radar signal such that a chirp is emitted during an off time between the sequential chirps of the further radar signal in the at least one of the plurality of frames of the further radar signal.

17. A method for a radar device, the method comprising:
emitting a radar signal including a plurality of frames that each comprise a respective sequence of chirps;
varying an off-time between sequential chirps of the respective sequence of chirps of a same frame of the plurality of frames; and
receiving from another radar device information about a further radar signal emitted by the further radar device, wherein the further radar signal includes a plurality of frames each comprising a respective sequence of chirps, and wherein the information about the further radar signal indicates at least one of:
a positioning of sequential chirps with respect to each other for at least one of the plurality of frames, or
a positioning of sequential frames with respect to each other in the further radar signal, or
dynamically adapting at least one parameter of the radar signal based on the information about the further radar signal such that a chirp is emitted during an off time between the sequential chirps of the further radar signal in the at least one of the plurality of frames of the further radar signal.

18. The method of claim 17, wherein dynamically adapting the at least one parameter of the radar signal based on the information about the further radar signal comprises causing the emitted radar signal to be transmitted at a different frequency from the radar signal emitted by the further radar device.

19. The method of claim 17, wherein the information about the further radar signal indicating the positioning of the sequential chirps with respect to each other comprises information describing frequencies and timing of the sequential chirps emitted by the further radar device.

* * * * *